(12) United States Patent
Chaiken et al.

(10) Patent No.: US 10,936,329 B2
(45) Date of Patent: Mar. 2, 2021

(54) SYSTEMS AND METHODS FOR DYNAMICALLY ELECTRICALLY MARGINING DEVICES IN AN INFORMATION HANDLING SYSTEM

(71) Applicant: Dell Products L.P., Round Rock, TX (US)

(72) Inventors: Craig Lawrence Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 16/404,046

(22) Filed: May 6, 2019

(65) Prior Publication Data

US 2020/0356377 A1  Nov. 12, 2020

(51) Int. Cl.
*G06F 9/4401* (2018.01)
*G06F 8/65* (2018.01)
*G06F 1/26* (2006.01)

(52) U.S. Cl.
CPC .............. *G06F 9/4411* (2013.01); *G06F 8/65* (2013.01); *G06F 1/26* (2013.01)

(58) Field of Classification Search
CPC ... G06F 1/26; G06F 8/65; G06F 8/654; G06F 9/4401; G06F 9/4411
See application file for complete search history.

(56) References Cited

U.S. PATENT DOCUMENTS

| 9,419,746 B1* | 8/2016 | Baeckler | H04L 25/0264 |
| 2005/0194958 A1* | 9/2005 | Morse | G06F 1/26 323/351 |
| 2020/0356377 A1* | 11/2020 | Chaiken | G06F 8/65 |

* cited by examiner

*Primary Examiner* — Terrell S Johnson
(74) *Attorney, Agent, or Firm* — Jackson Walker L.L.P.

(57) ABSTRACT

An information handling system may include a processor, an information handling resource communicatively coupled to the processor, and an electrical margining module communicatively coupled to the processor. The electrical margining module may be configured to, during a boot of the information handling system, determine whether a condition has occurred for electrically re-margining the information handling resource, and responsive to determining that the condition has occurred, determine a new receiver equalization setting for receiving signals from the information handling resource and determine a new driver pre-emphasis setting for transmitting signals to the information handling resource.

20 Claims, 4 Drawing Sheets

SYSTEMS AND METHODS FOR DYNAMICALLY ELECTRICALLY MARGINING DEVICES IN AN INFORMATION HANDLING SYSTEM

TECHNICAL FIELD

The present disclosure relates in general to information handling systems, and more particularly to systems and methods for proactively dynamically electrically margining devices, including storage media such as hard disk drives, in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The term "storage media" may in general refer to any system, apparatus, or device configured to store electronic data for a period of time. Thus, such term may refer to volatile memories, non-volatile memories, hard disk drives, solid state drives, and other types of storage media.

Failed hard disk drives returned to manufacturers for failure analysis are often reported as having "no fault found." According to one study, "no fault found" rates run between 15% and 60% of returned hard disk drives, depending on the manufacturer.

Currently, receiver continuous-time linear equalization (CTLE) and transmitter pre-emphasis settings for a Serial Advanced Technology Attachment (SATA) port are determined during development of an information handling system and are selected as a compromise for all information handling resources (e.g., hard disk drives, cables, printed circuit boards) and environmental conditions (e.g., temperatures) for the information handling system under development. Accordingly, such settings may be suboptimal for any specific device, and often, some information handling resource (e.g., hard disk drives, cables, printed circuit boards) and temperature combinations operate outside of recommended specifications.

In response to failures of devices in the field, a manufacturer may release a BIOS or other firmware update to modify electrical margining settings in accordance with a particular configuration of an information handling system. However, such updates may cause non-failed devices to become unstable.

SUMMARY

In accordance with the teachings of the present disclosure, the disadvantages and problems associated with existing approaches to minimizing storage media failures in an information handling system may be reduced or eliminated.

In accordance with embodiments of the present application, an information handling system may include a processor, an information handling resource communicatively coupled to the processor, and an electrical margining module communicatively coupled to the processor. The electrical margining module may be configured to, during a boot of the information handling system, determine whether a condition has occurred for electrically re-margining the information handling resource, and responsive to determining that the condition has occurred, determine a new receiver equalization setting for receiving signals from the information handling resource and determine a new driver pre-emphasis setting for transmitting signals to the information handling resource.

In accordance with these and other embodiments of the present application, a method may include, during a boot of an information handling system, determining whether a condition has occurred for electrically re-margining an information handling resource of the information handling system, and responsive to determining that the condition has occurred, determining a new receiver equalization setting for receiving signals from the information handling resource and determining a new driver pre-emphasis setting for transmitting signals to the information handling resource.

In accordance with these and other embodiments of the present application, an article of manufacture may include a non-transitory computer-readable medium and computer-executable instructions carried on the computer-readable medium, the instructions readable by a processor, the instructions, when read and executed, for causing the processor to, in an information handling system comprising a memory communicatively coupled to the processor and comprising a plurality of non-volatile memories, determine whether a condition has occurred for electrically re-margining an information handling resource of the information handling system, and responsive to determining that the condition has occurred, determine a new receiver equalization setting for receiving signals from the information handling resource and determine a new driver pre-emphasis setting for transmitting signals to the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
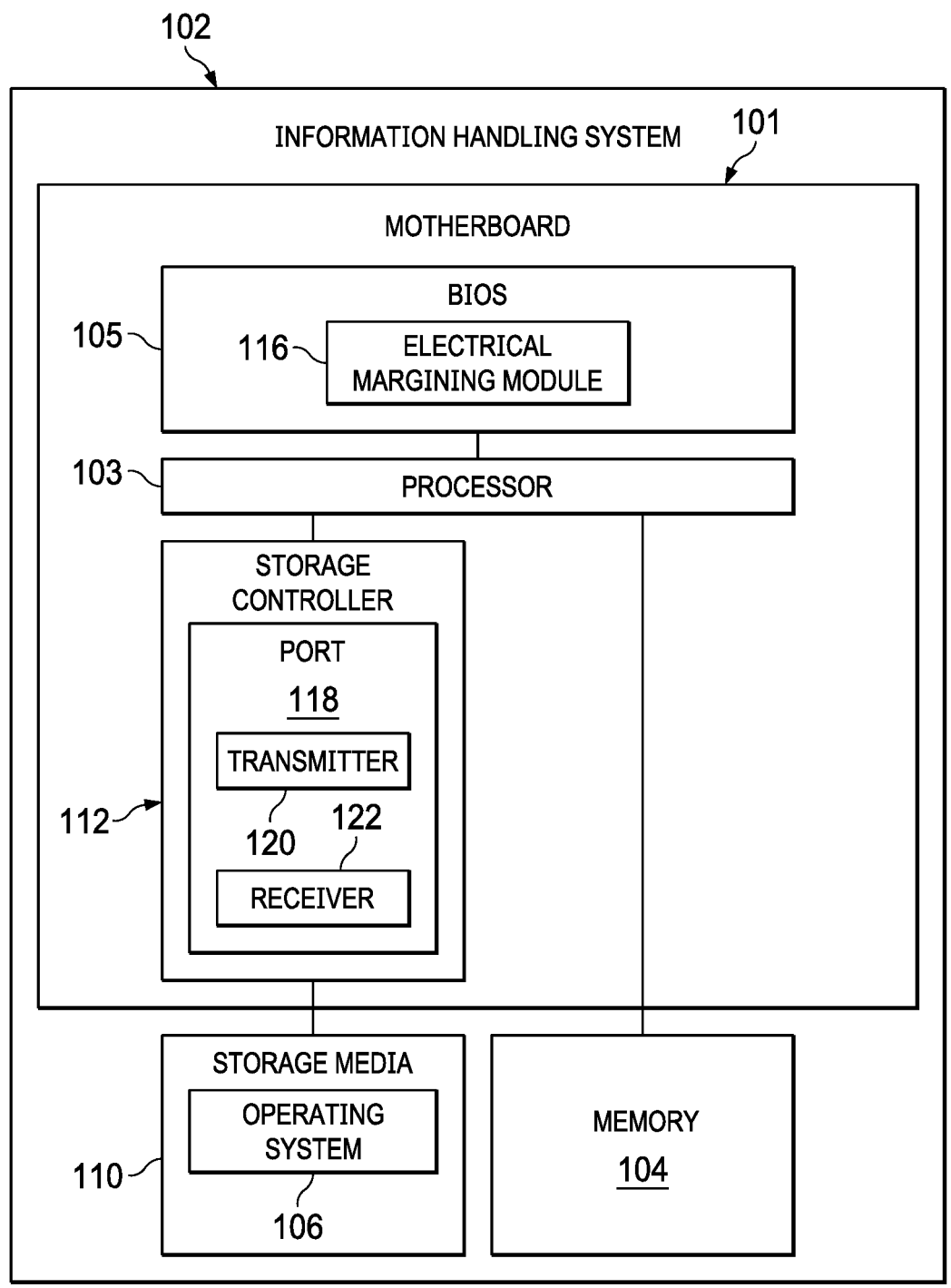
FIG. 1 illustrates a block diagram of an example information handling system, in accordance with embodiments of the present disclosure.
Figure 2A:
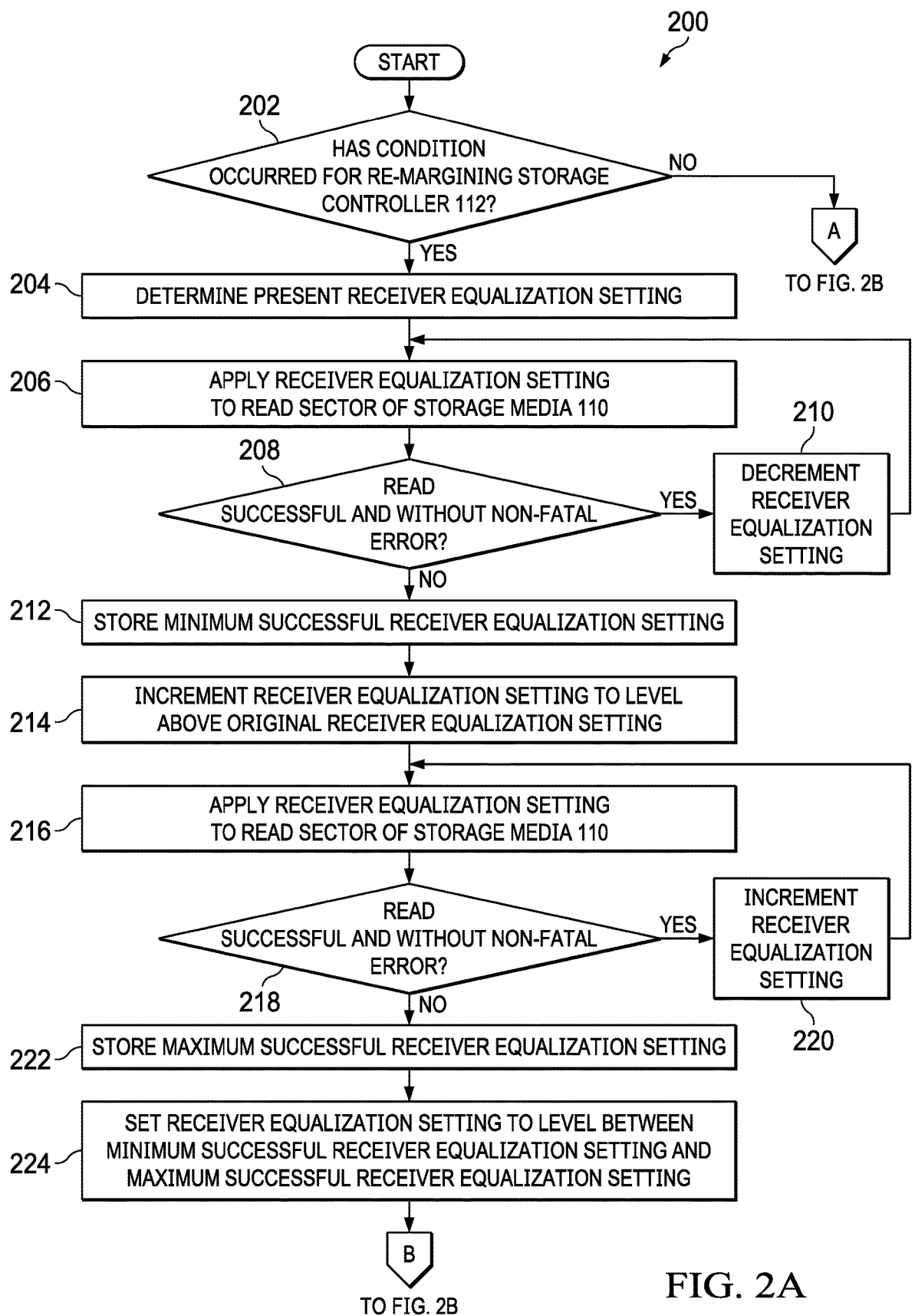
FIGS. 2A and 2B (which may collectively be referred to herein as FIG. 2) illustrate a flow chart of an example method for determining whether to perform dynamic electrical margining of a storage controller, in accordance with embodiments of the present disclosure.
Figure 2B:
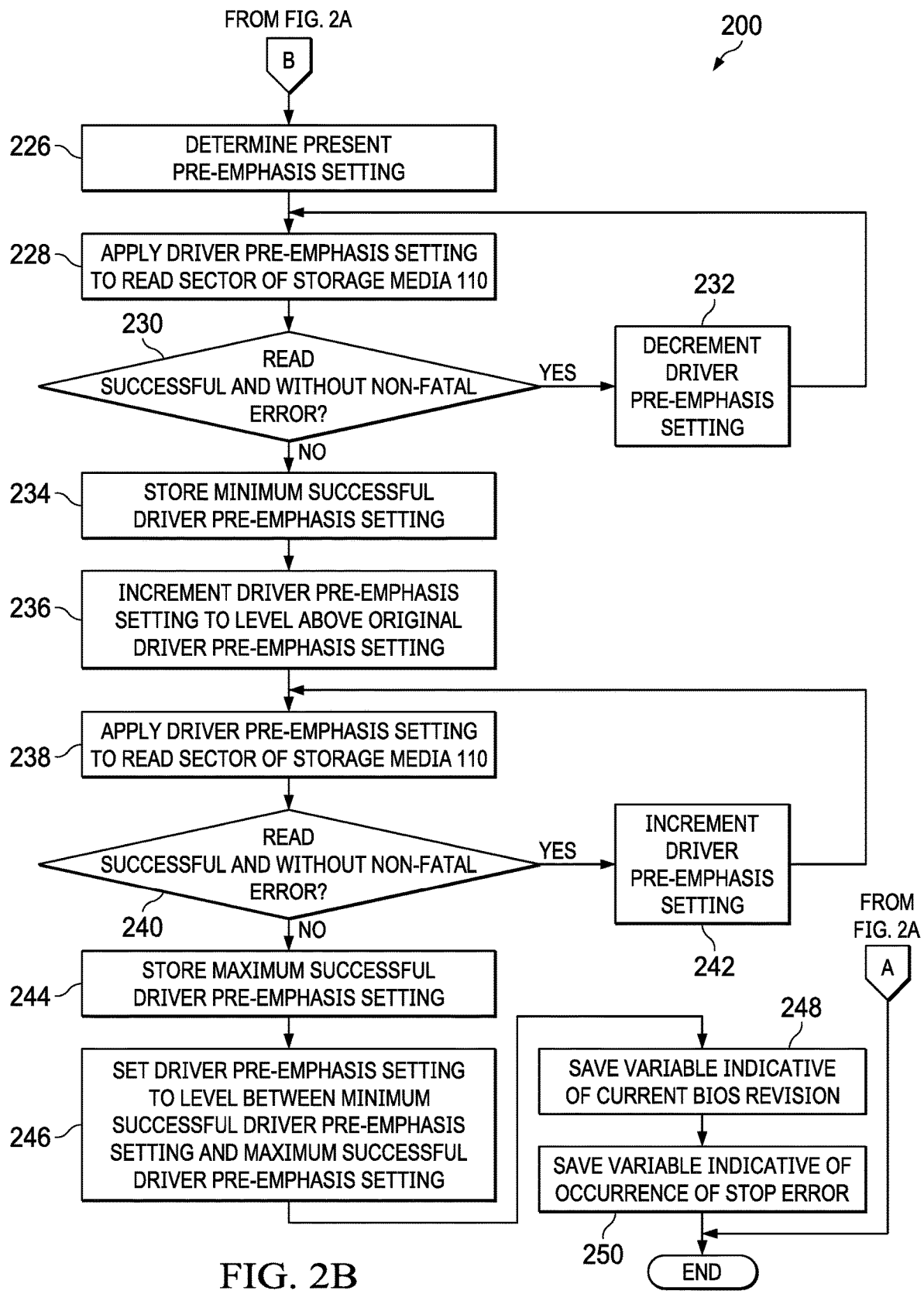
Figure 3:
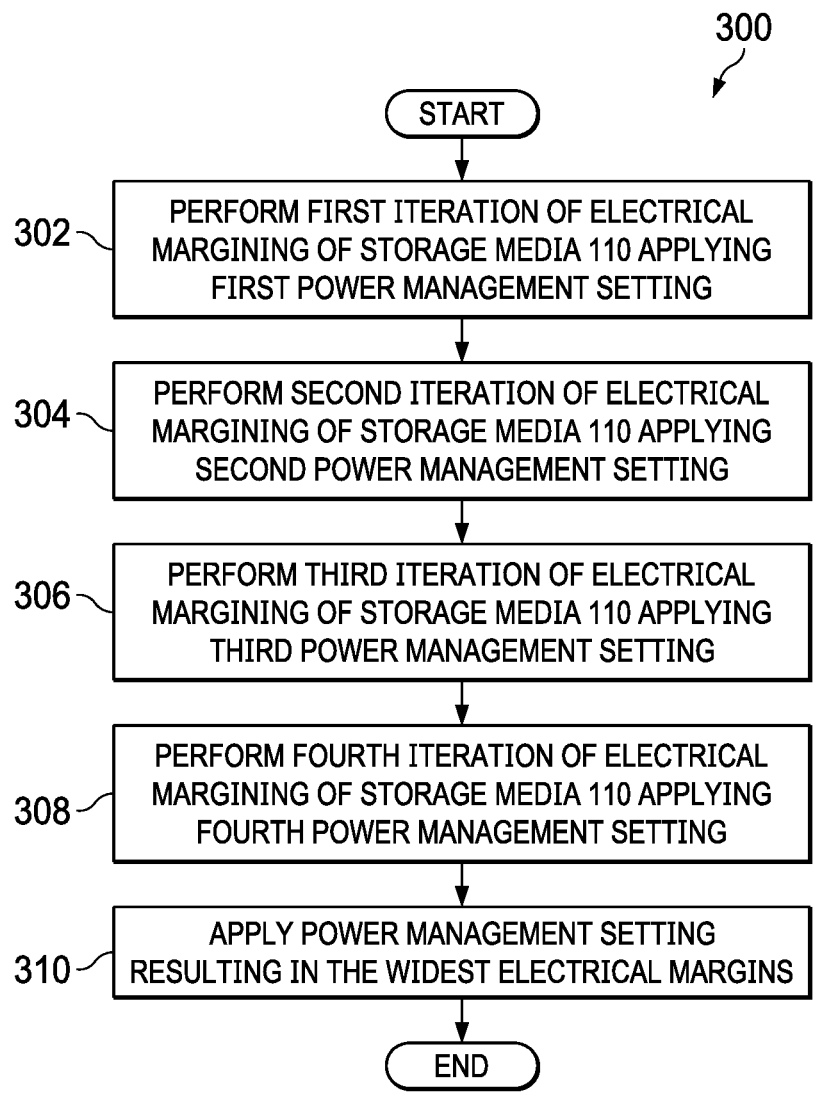
FIG. 3 illustrates a flow chart of an example method for applying power management settings to electrical margining settings, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102, in accordance with embodiments of the present disclosure. As depicted, information handling system 102 may include a motherboard 101, a memory 104, and storage media 110.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a BIOS 105, a storage controller 112, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 110, and/or another component of information handling system 102.

BIOS 105 may be communicatively coupled to processor 103 and may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may include an electrical margining module 116. Electrical margining module 116 may comprise any program of instructions that may be read and executed by processor 103, and when executed by processor 103, for the dynamic electrical margining of storage media 110 and/or other information handling resources, as described in greater detail below.

Storage controller 112 may be communicatively coupled to processor 103 and may include any system, device, or apparatus configured to serve as an interface for communication between processor 103 and storage media 110 to facilitate communication of data between processor 103 and storage media 110 in accordance with any suitable standard or protocol (e.g., SATA). In some embodiments, storage controller 112 may provide functionality including, without limitation, disk aggregation and redundancy (e.g., RAID), I/O routing, and error detection and recovery. Storage controller 112 may also have features supporting shared storage and high availability. In some embodiments, storage controller 112 may comprise a RAID controller such as PowerEdge RAID Controller (PERC) manufactured by Dell Inc. In addition or alternatively, in some embodiments, some or all of the functionality of storage controller 112 may be implemented in software code executable on processor 103 (e.g., by a RAID driver). Although storage controller 112 is shown internal to motherboard 101 in FIG. 1, in some embodiments, storage controller 112 may reside external to motherboard 101.

As shown in FIG. 1, storage controller 112 may include a port 118, to which storage media 110 may be communicatively coupled. As also shown, port 118 may include a transmitter 120 for transmitting electrical signals to storage media 110 and a receiver 122 for receiving electrical signals from storage media 110.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Although memory 104 is shown external to motherboard 101 in FIG. 1, in some embodiments, memory 104 may reside on motherboard 101.

Storage media 110 may be communicatively coupled to processor 103 and may include any system, device, or apparatus operable to store information processed by processor 103. Storage media 110 may include, for example, a direct access storage device (e.g., a hard disk drive, a solid state drive, etc.)

As shown in FIG. 1, storage media 110 may have stored therein an operating system 106. Operating system 106 may be any program of executable instructions, or aggregation of programs of executable instructions, configured to manage and/or control the allocation and usage of hardware resources (e.g., processor 103, memory 104, storage media 110, and/or other information handling resources) and provide an interface between such hardware resources and application programs hosted by operating system 106, and thus may act as a host for application programs to be executed by information handling system 102. Active portions of operating system 106 may be loaded into memory 104 and read and executed by processor 103 in order to carry out the functionality of operating system 106. Examples of operating system 106 may include, without limitation, Windows, MacOS, UNIX, LINUX, Android, iOS, or any other closed or open source operating system.

In addition to motherboard 101, processor 103, memory 104, BIOS 105, storage media 110, and storage controller 112. information handling system 102 may include one or more other information handling resources.

In operation, storage controller 112 may be configured to, among other things, control transmitter 120 and receiver 122 to operate in accordance with electrical margining settings. Such electrical margining settings may include an amplification or pre-emphasis applied to signals transmitted by transmitter 120 to storage media 110 as well as a receiver equalization (e.g., a continuous-time linear equalization or CTLE) applied to signals received by receiver 122. By default, storage controller 112 may apply electrical margining settings for storage controller 112 that were chosen during development of information handling system 102. However, responsive to a condition for re-margining storage controller 112, electrical margining module 116 may be configured to, as is described in greater detail below, perform dynamic electrical margining of storage controller 112 to establish new electrical margining settings. Such condition for re-margining storage controller 112 may include, without limitation, one or more of replacement of storage media 110, a chassis intrusion of information handling system 102, an increase in error rates of storage media 110 beyond a threshold rate, a lack of detection of storage media 110, an unexpected shutdown of information handling system 102, a stop error (e.g., "Blue Screen of Death") of information handling system 102, and a firmware update to BIOS 105.

Functionality of electrical margining module 116 is further illustrated below in FIGS. 2 and 3 and the descriptions thereof.

FIG. 2 illustrates a flow chart of an example method 200 for performing dynamic electrical margining of storage controller 112, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during boot of information handling system 102, electrical margining module 116 of BIOS 105 may, for each port (e.g., port 118) with storage media 110 attached, determine if a condition has occurred for re-margining storage controller 112. Such condition for re-margining storage controller 112 may include, without limitation, one or more of replacement of storage media 110, a chassis intrusion of information handling system 102, an increase in error rates of storage media 110 beyond a threshold rate, a lack of detection of storage media 110, an unexpected shutdown of information handling system 102, a stop error (e.g., "Blue Screen of Death") of information handling system 102, and a firmware update to BIOS 105. If a condition has occurred for re-margining storage controller 112, method 200 may proceed to step 204. Otherwise, method 200 may end.

At step 204, electrical margining module 116 may determine a present receiver equalization setting for receiver 122 as applied to storage media 110. At step 206, electrical margining module 116 may apply the receiver equalization setting and then read a sector of storage media 110 (e.g., a sector at Logical Block Address 0). At step 208, electrical margining module 116 may determine if the attempted read was successful and without a non-fatal error. A non-fatal error may include, for example, a correctable hard disk drive communication error, which may be indicated if a particular status bit associated with the read (e.g., Advanced Host Controller Interface port offset 10*h* bit 26). If the read is successful and without a non-fatal error, method 200 may proceed to step 210. Otherwise, method 200 may proceed to step 212.

At step 210, if the attempted read was successful, electrical margining module 116 may decrement the receiver equalization setting (e.g., decrease a signal gain of receiver equalization setting by the smallest possible amount). After step 210, method 200 may proceed again to step 206.

At step 212, if the attempted read was unsuccessful, electrical margining module 116 may store the minimum successful receiver equalization setting.

At step 214, electrical margining module 116 may increment the receiver equalization setting to a level greater than that of the receiver equalization setting determined at step 204 (e.g., increase a signal gain of receiver equalization setting by the smallest possible amount above the original receiver equalization setting determined at step 204). At step 216, electrical margining module 116 may apply the receiver equalization setting to read a sector of storage media 110 (e.g., a sector at Logical Block Address 0). At step 218, electrical margining module 116 may determine if the attempted read was successful and without a non-fatal error. If the read was successful and without a non-fatal error, method 200 may proceed to step 220. Otherwise, method 200 may proceed to step 222.

At step 220, if the attempted read was successful, electrical margining module 116 may increment the receiver equalization setting (e.g., increase a signal gain of receiver equalization setting by the smallest possible amount). After step 220, method 200 may proceed again to step 216.

At step 222, if the attempted read was unsuccessful, electrical margining module 116 may store the maximum successful receiver equalization setting.

At step 224, electrical margining module 116 may set the receiver equalization setting for the particular storage media 110 to a level between the minimum successful receiver equalization setting and the maximum successful receiver equalization setting (e.g., at a midpoint between the minimum and the maximum). Electrical margining module 116 may store this new receiver equalization setting in order that such new receiver equalization setting is applied to subsequent reads of data from storage media 110.

At step 226, electrical margining module 116 may determine a present driver pre-emphasis setting for transmitter 120 as applied to storage media 110. At step 228, electrical margining module 116 may apply the driver pre-emphasis setting to read a sector of storage media 110 (e.g., a sector at Logical Block Address 0). At step 230, electrical margining module 116 may determine if the attempted read was successful and without a non-fatal error. If the read was successful and without a non-fatal error, method 200 may proceed to step 232. Otherwise, method 200 may proceed to step 234.

At step 232, if the attempted read was successful, electrical margining module 116 may decrement the driver pre-emphasis setting (e.g., decrease a signal gain of the driver pre-emphasis setting by the smallest possible amount). After step 232, method 200 may proceed again to step 238.

At step 234, if the attempted read was unsuccessful, electrical margining module 116 may store the minimum successful driver pre-emphasis setting.

At step 236, electrical margining module 116 may increment the receiver equalization setting to a level greater than that of the driver pre-emphasis setting determined at step 226 (e.g., increase a signal gain of the driver pre-emphasis setting by the smallest possible amount above the original driver pre-emphasis setting determined at step 226). At step 238, electrical margining module 116 may apply the driver pre-emphasis setting and then read a sector of storage media 110 (e.g., a sector at Logical Block Address 0). At step 240, electrical margining module 116 may determine if the attempted read was successful and without a non-fatal error. If the read was successful and without a non-fatal error, method 200 may proceed to step 242. Otherwise, method 200 may proceed to step 254.

At step 242, if the attempted read was successful, electrical margining module 116 may increment the driver pre-emphasis setting (e.g., increase a signal gain of the driver pre-emphasis setting by the smallest possible amount). After step 242, method 200 may proceed again to step 238.

At step 244, if the attempted read was unsuccessful, electrical margining module 116 may store the maximum successful driver pre-emphasis setting.

At step 246, electrical margining module 116 may set the driver pre-emphasis setting for the particular storage media 110 to a level between the minimum successful driver pre-emphasis setting and the maximum successful driver pre-emphasis setting (e.g., at a midpoint between the minimum and the maximum). Electrical margining module 116 may store this new driver pre-emphasis setting in order that such new driver pre-emphasis setting is applied to subsequent writes of data to storage media 110.

At step 248, electrical margining module 116 may save a variable indicative of the current BIOS revision, so that such information may be used in the future by electrical margining module 116 to determine if a change has occurred to BIOS 105 that constitutes a condition for performing re-margining. Similarly, at step 250, electrical margining module 116 may save a variable indicative of a BugCheckCode or other value indicative of a stop error (e.g. Blue Screen of Death), so that such information may be used in the future by electrical margining module 116 to determine if a stop error has occurred that constitutes a condition for performing re-margining.

After completion of step 250, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

It is noted that method 200 may be conducted for each storage media device of information handling system 102, such that each storage media device is assigned its own respective driver pre-emphasis setting and its own receiver equalization setting.

In addition, although method 200 contemplates electrical margining for storage media, the approaches to electrical margining described herein may be applied to any input/output operation to any suitable information handling resource.

FIG. 3 illustrates a flow chart of an example method 300 for applying power management settings to electrical margining settings, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, in a first iteration of performing electrical margining of storage media 110 in accordance with method 200 above, electrical margining module 116 may apply a first power management setting to such electrical margining. For example, under the first power management setting, SATA slumber may be enabled and partial SATA slumber may be enabled. After such first iteration, the electrical margins (e.g., the difference between maximum driver pre-emphasis setting and minimum driver pre-emphasis setting and the difference between maximum receiver equalization setting and minimum receiver equalization setting) may be stored.

At step 304, a second iteration of electrical margining of storage media 110 may be performed and electrical margining module 116 may apply a second power management setting with a lower priority than the first power management setting to such electrical margining. For example, under the second power management setting, SATA slumber may be disabled and partial SATA slumber may be enabled. After such second iteration, the electrical margins may be stored.

At step 306, a third iteration of electrical margining of storage media 110 may be performed and electrical margining module 116 may apply a third power management setting with a lower priority than the second power management setting to such electrical margining. For example, under the third power management setting, SATA slumber may be enabled and partial SATA slumber may be disabled. After such third iteration, the electrical margins may be stored.

At step 308, a fourth iteration of electrical margining of storage media 110 may be performed and electrical margining module 116 may apply a fourth power management setting with a lower priority than the third power management setting to such electrical margining. For example, under the fourth power management setting, SATA slumber may be disabled and partial SATA slumber may be disabled. After such fourth iteration, the electrical margins may be stored.

At step 310, electrical margining module 116 may determine which of the power management settings resulted in the widest electrical margins and apply such power management setting. In some instances in which electrical margins of one power management setting are similar in magnitude to another power management setting, electrical margining module 116 may select the power management setting of the higher priority. After completion of step 310, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
an information handling resource communicatively coupled to the processor; and
an electrical margining module communicatively coupled to the processor and configured to, during a boot of the information handling system:
determine whether a condition has occurred for electrically re-margining the information handling resource; and
responsive to determining that the condition has occurred:

determine a new receiver equalization setting for receiving signals from the information handling resource; and determine a new driver pre-emphasis setting for transmitting signals to the information handling resource.

2. The information handling system of claim 1, wherein the information handling resource comprises a storage media device.

3. The information handling system of claim 1, wherein the condition for electrically re-margining the information handling resource comprises a replacement of the information handling resource.

4. The information handling system of claim 1, wherein the condition for electrically re-margining the information handling resource comprises an error rate associated with the information handling resource exceeding a threshold rate.

5. The information handling system of claim 1, wherein the condition for electrically re-margining the information handling resource comprises a lack of detection of the information handling resource.

6. The information handling system of claim 1, wherein the condition for electrically re-margining the information handling resource comprises an unexpected shutdown of the information handling system.

7. The information handling system of claim 1, wherein the condition for electrically re-margining the information handling resource comprises a stop error of the information handling system.

8. The information handling system of claim 1, wherein the condition for electrically re-margining the information handling resource comprises a firmware update to a basic input/output system the information handling system.

9. The information handling system of claim 1, wherein the electrical margining module is embodied in a basic input/output system the information handling system.

10. The information handling system of claim 1, wherein determining the new receiver equalization setting for receiving signals from the information handling resource and determining the new driver pre-emphasis setting for transmitting signals to the information handling resource comprises determining electrical margins for receiver equalization and driver pre-emphasis at a plurality of power management settings for the information handling resource and selecting the power management setting providing the widest electrical margins.

11. A method comprising, during a boot of an information handling system:

determining whether a condition has occurred for electrically re-margining an information handling resource of the information handling system; and responsive to determining that the condition has occurred:

determining a new receiver equalization setting for receiving signals from the information handling resource; and determining a new driver pre-emphasis setting for transmitting signals to the information handling resource.

12. The method of claim 11, wherein the information handling resource comprises a storage media device.

13. The method of claim 11, wherein the condition for electrically re-margining the information handling resource comprises a replacement of the information handling resource.

14. The method of claim 11, wherein the condition for electrically re-margining the information handling resource comprises an error rate associated with the information handling resource exceeding a threshold rate.

15. The method of claim 11, wherein the condition for electrically re-margining the information handling resource comprises a lack of detection of the information handling resource.

16. The method of claim 11, wherein the condition for electrically re-margining the information handling resource comprises an unexpected shutdown of the information handling system.

17. The method of claim 11, wherein the condition for electrically re-margining the information handling resource comprises a stop error of the information handling system.

18. The method of claim 11, wherein the condition for electrically re-margining the information handling resource comprises a firmware update to a basic input/output system the information handling system.

19. The method of claim 11, wherein determining the new receiver equalization setting for receiving signals from the information handling resource and determining the new driver pre-emphasis setting for transmitting signals to the information handling resource comprises determining electrical margins for receiver equalization and driver pre-emphasis at a plurality of power management settings for the information handling resource and selecting the power management setting providing the widest electrical margins.

20. An article of manufacture comprising:

a non-transitory computer-readable medium; and computer-executable instructions carried on the computer-readable medium, the instructions readable by a processor, the instructions, when read and executed, for causing the processor to, in an information handling system comprising a memory communicatively coupled to the processor and comprising a plurality of non-volatile memories:

determine whether a condition has occurred for electrically re-margining an information handling resource of the information handling system; and responsive to determining that the condition has occurred:

determine a new receiver equalization setting for receiving signals from the information handling resource; and determine a new driver pre-emphasis setting for transmitting signals to the information handling resource.

* * * * *